US006379248B1

(12) United States Patent
Jorasch et al.

(10) Patent No.: US 6,379,248 B1
(45) Date of Patent: Apr. 30, 2002

(54) METHOD AND APPARATUS FOR CONTROLLING A GAMING DEVICE HAVING A PLURALITY OF BALANCES

(75) Inventors: James A. Jorasch, Stamford; Magdalena Mik, Wallingford, both of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/371,341

(22) Filed: Aug. 10, 1999

Related U.S. Application Data

(63) Continuation of application No. 09/055,655, filed on Apr. 6, 1998, now Pat. No. 5,967,896.

(51) Int. Cl.⁷ .................................................. A63F 9/24
(52) U.S. Cl. ......................................................... 463/25
(58) Field of Search ................................. 463/1, 11–13, 463/16–20, 25, 29–30, 36, 40–42; 273/138.1, 138.2, 139, 143 R, 292–293; 340/323 R; 235/375, 380; 902/22–24; 705/1, 14, 16–17, 39, 41, 44

(56) References Cited

U.S. PATENT DOCUMENTS 5,967,896 A * 10/1999 Jorasch et al. ................ 463/25

* cited by examiner

Primary Examiner—Mark Sager
(74) Attorney, Agent, or Firm—Michael D. Downs

(57) ABSTRACT

In accordance with the present invention, a gaming device includes a plurality of balances. The gaming device receives monetary input such as currency or a transfer from an account, and in turn increases one or more balances. The balance increased depends on criteria such as the amount of monetary input or the source (e.g. from a casino account). Players may draw wager amounts from different balances, and add award amounts to the balances. Incentives are provided for using the different balances. For example, different balances may have different payout schedules, different probability schedules, or both.

31 Claims, 14 Drawing Sheets

500

| OUTCOME 502 | RANDOM NUMBER 504 | EXPECTED HITS PER CYCLE 506 |
|---|---|---|
| NONWINNING COMBINATION | 1-8570 | 8570 |
| CHERRY/ANY/ANY | 8571-9250 | 680 |
| ANY/ANY/CHERRY | 9251-9930 | 680 |
| CHERRY/CHERRY/ANY | 9931-10130 | 200 |
| ANY/CHERRY/CHERRY | 10131-10330 | 200 |
| CHERRY/ANY/CHERRY | 10331-10398 | 68 |
| CHERRY/CHERRY/CHERRY | 10399-10418 | 20 |
| BAR/ORANGE/ORANGE | 10419-10460 | 42 |
| ORANGE/ORANGE/BAR | 10461-10466 | 6 |
| ORANGE/ORANGE/ORANGE | 10467-10508 | 42 |
| BAR/PLUM/PLUM | 10509-10528 | 20 |
| PLUM/PLUM/BAR | 10529-10533 | 5 |
| PLUM/PLUM/PLUM | 10534-10583 | 50 |
| BAR/BELL/BELL | 10584-10587 | 4 |
| BELL/BELL/BAR | 10588-10607 | 20 |
| BELL/BELL/BELL | 10608-10627 | 20 |
| BAR/BAR/BAR | 10628-10647 | 20 |
| 7/7/7 | 10648 | 1 |

| OUTCOME 552 | AWARD AMOUNT 554 |
|---|---|
| NONWINNING COMBINATION | 0 |
| CHERRY/ANY/ANY | 2 |
| ANY/ANY/CHERRY | 2 |
| CHERRY/CHERRY/ANY | 5 |
| ANY/CHERRY/CHERRY | 5 |
| CHERRY/ANY/CHERRY | 5 |
| CHERRY/CHERRY/CHERRY | 20 |
| BAR/ORANGE/ORANGE | 10 |
| ORANGE/ORANGE/BAR | 10 |
| ORANGE/ORANGE/ORANGE | 20 |
| BAR/PLUM/PLUM | 14 |
| PLUM/PLUM/BAR | 14 |
| PLUM/PLUM/PLUM | 20 |
| BAR/BELL/BELL | 18 |
| BELL/BELL/BAR | 18 |
| BELL/BELL/BELL | 20 |
| BAR/BAR/BAR | 50 |
| 7/7/7 | 100 |

FIG. 9

| | | NON-BANKROLL BALANCE | | BANKROLL BALANCE | | CASINO ACCOUNT BALANCE | |
|---|---|---|---|---|---|---|---|
| | OUTCOME 602 | RANDOM NUMBER 645 | EXPECTED HITS PER CYCLE 650 | RANDOM NUMBER 655 | EXPECTED HITS PER CYCLE 660 | RANDOM NUMBER 665 | EXPECTED HITS PER CYCLE 670 |
| 608 | NONWINNING COMBINATION | 1-8570 | 8570 | 1-8562 | 8562 | 1-8546 | 8546 |
| 610 | CHERRY/ANY/ANY | 8571-9250 | 680 | 8563-9242 | 680 | 8547-9226 | 680 |
| 612 | ANY/ANY/CHERRY | 9251-9930 | 680 | 9243-9922 | 680 | 9227-9906 | 680 |
| 614 | CHERRY/CHERRY/ANY | 9931-10130 | 200 | 9923-10122 | 200 | 9907-10106 | 200 |
| 616 | ANY/CHERRY/CHERRY | 10131-10330 | 200 | 10123-10322 | 200 | 10107-10306 | 200 |
| 618 | CHERRY/ANY/CHERRY | 10331-10398 | 68 | 10323-10394 | 72 | 10307-10386 | 80 |
| 620 | CHERRY/CHERRY/CHERRY | 10399-10418 | 20 | 10395-10414 | 20 | 10387-10406 | 20 |
| 622 | BAR/ORANGE/ORANGE | 10419-10460 | 42 | 10415-10456 | 42 | 10407-10448 | 42 |
| 624 | ORANGE/ORANGE/BAR | 10461-10466 | 6 | 10457-10462 | 6 | 10449-10454 | 6 |
| 626 | ORANGE/ORANGE/ORANGE | 10467-10508 | 42 | 10463-10506 | 44 | 10455-10502 | 48 |
| 628 | BAR/PLUM/PLUM | 10509-10528 | 20 | 10507-10526 | 20 | 10503-10522 | 20 |
| 630 | PLUM/PLUM/BAR | 10529-10533 | 5 | 10527-10531 | 5 | 10523-10527 | 5 |
| 632 | PLUM/PLUM/PLUM | 10534-10583 | 50 | 10532-10581 | 50 | 10528-10577 | 50 |
| 634 | BAR/BELL/BELL | 10584-10587 | 4 | 10582-10585 | 4 | 10578-10581 | 4 |
| 636 | BELL/BELL/BAR | 10588-10607 | 20 | 10586-10605 | 20 | 10582-10601 | 20 |
| 638 | BELL/BELL/BELL | 10608-10627 | 20 | 10606-10625 | 20 | 10602-10621 | 20 |
| 640 | BAR/BAR/BAR | 10628-10647 | 20 | 10626-10647 | 22 | 10622-10647 | 26 |
| 642 | 7/7/7 | 10648 | 1 | 10648 | 1 | 10648 | 1 |

FIG. 10

| OUTCOME 702 | NON-BANKROLL BALANCE 744 | BANKROLL BALANCE 746 | CASINO ACCOUNT BALANCE 748 |
|---|---|---|---|
| NONWINNING COMBIMATION | 0 | 0 | 0 |
| CHERRY/ANY/ANY | 2 | 2 | 2 |
| ANY/ANY/CHERRY | 2 | 2 | 2 |
| CHERRY/CHERRY/ANY | 5 | 5 | 5 |
| ANY/CHERRY/CHERRY | 5 | 5 | 5 |
| CHERRY/ANY/CHERRY | 5 | 5 | 5 |
| CHERRY/CHERRY/CHERRY | 20 | 20 | 20 |
| BAR/ORANGE/ORANGE | 10 | 10 | 10 |
| ORANGE/ORANGE/BAR | 10 | 10 | 10 |
| ORANGE/ORANGE/ORANGE | 20 | 20 | 20 |
| BAR/PLUM/PLUM | 14 | 14 | 14 |
| PLUM/PLUM/BAR | 14 | 14 | 14 |
| PLUM/PLUM/PLUM | 20 | 20 | 20 |
| BAR/BELL/BELL | 18 | 18 | 18 |
| BELL/BELL/BAR | 18 | 18 | 18 |
| BELL/BELL/BELL | 20 | 20 | 20 |
| BAR/BAR/BAR | 50 | 60 | 70 |
| 7/7/7 | 100 | 120 | 130 |

FIG. 11

METHOD AND APPARATUS FOR CONTROLLING A GAMING DEVICE HAVING A PLURALITY OF BALANCES

The present application is a continuation of commonly-owned U.S. patent application Ser. No. 09/055,655, filed Apr. 6, 1998 and entitled METHOD AND APPARATUS FOR CONTROLLING A GAMING DEVICE HAVING A PLURALITY OF BALANCES, which issued on Oct. 19, 1999 as U.S. Pat. No. 5,967,896 and which is hereby incorporated by reference in its entirety.

FIELD OF THE INVENTION

The present invention relates generally to gaming devices and more specifically to gaming devices that dispense monetary output.

BACKGROUND OF THE INVENTION

A conventional gaming device, such as a slot machine, video poker machine or video blackjack machine, typically requires a player to establish an initial "balance" by providing the gaming device with monetary input. For example, the player may insert currency (bills, coins and/or tokens) into the gaming device. Alternatively, the player may have funds transferred to the gaming device from an account, such as a credit card account or casino account that is identified by a card inserted into the gaming device. Once a balance is established, it is available for initiating a play of the gaming device.

The player then selects a wager amount which is subtracted from the balance (i.e. the wager amount is "drawn" from the balance), and initiates a play by pulling a handle or pressing a button on the gaming device. For example, the player may select a wager amount of three coins from a balance of ten coins. In response, the gaming device generates a game outcome (e.g. "CHERRY/CHERRY/CHERRY" for a slot machine) and a corresponding award amount that is based on the game outcome. The award amount may be zero for unfavorable game outcomes, or a greater amount for more favorable outcomes. Typically, greater award amounts correspond to more unlikely game outcomes. The balance is increased by the award amount, thereby generating an adjusted balance that is available for initiating a subsequent play of the gaming device.

After any number of such plays, the player may direct the gaming device to dispense the adjusted balance, thereby providing the player with monetary output. Dispensing typically includes activating a hopper in the gaming device to dispense currency to the player. Some gaming devices alternatively transfer the dispensed amount to a credit card account or other account, thereby eliminating the need for the player to hold and carry dispensed currency. After dispensing, the balance of the gaming device is zero, and another initial balance must be established before subsequent plays of the gaming device may be initiated.

If a player establishes a relatively large initial balance, he can enjoy many plays before the balance diminishes and more monetary input is required to continue. However, if the player establishes a relatively small initial balance, he must continually provide monetary input after each few plays. A player that establishes a small balance is likely to maintain a small balance during subsequent plays. He is in turn likely to "cash out" (have the balance dispensed as currency) if his award amounts increase the balance significantly.

Many players prefer to establish small balances, thereby retaining as much currency as possible. Players may do so in order to maintain physical control over their currency by holding it in their pocket or in a bucket. In addition, it is more convenient to retain currency for uses such as purchasing food or drinks from a cocktail server, tipping a cocktail server, or providing a companion with currency. In addition, it is inconvenient for the player to have to cash out each time he has to leave the gaming device (e.g. to get a drink, visit another player, or go to a rest room). Players may also worry that a power loss or similar electronic mishap will adversely affect the balance stored in the gaming device.

Conversely, casinos prefer that players establish large balances. Each time a player cashes out, he may decide to stop playing, particularly given the need to re-supply the gaming device with more monetary input. Further, the time spent dispensing the entire balance to the player and re-supplying the gaming device with monetary input is time during which no plays can occur. Accordingly, such time represents lost profits to the casino. In addition, dispensing currency exerts wear and tear on various components of the gaming device, and may eventually require repair and/or replacement of those components. Similarly, it is expensive for a casino to handle the vast amount of currency that is collected in its gaming devices. The casino must expend considerable resources in collecting, counting and moving coins, bills and tokens.

Casinos also prefer that players play from a large initial balance, rather than from repeatedly-inserted currency. Players tend to perceive a balance as somewhat less valuable than a corresponding amount of currency. Accordingly, players are more likely to continue playing as long as a balance remains, especially if the balance eventually decreases to a relatively small value. For example, if a gaming device with a minimum wager amount of $0.25 has a balance of $3, the typical player is more likely to play until the balance is reduced to zero, rather than cash out.

For similar reasons, casinos prefer that players use a casino account, rather than use currency or credit card accounts. Players that have a casino account have an incentive to continue playing at that casino rather than another. Further, while a player maintains a balance in a casino account, the casino has access to those funds and may, for example, derive interest payments therefrom. Even when funds are withdrawn from a casino account, they are used in a gaming device, and thereby become revenue for the casino.

Accordingly, when a player maintains a large balance or uses a casino account, the player essentially commits himself to a long session of play. The longer he plays, the greater the expected profit of the casino. Unfortunately, many players do neither. Conventional gaming devices do not provide any incentive for either maintaining a large balance or using a casino account.

SUMMARY OF THE INVENTION

In accordance with the present invention, a gaming device includes a plurality of balances. The gaming device receives monetary input, such as currency or a transfer from an account, and in turn increases one or more balances. The balance increased depends on criteria such as the amount of monetary input or the source of monetary input (e.g. from a casino account). Players may draw wager amounts from different balances, and add award amounts to the balances. Incentives are provided for using the different balances. For example, different balances may have different payout schedules, different probability schedules, or both.

BRIEF DESCRIPTION OF THE DRAWINGS

FIG. 8 is a schematic illustration of a probability schedule of a gaming device of FIG. 3.

FIG. 9 is a schematic illustration of a payout schedule of a gaming device of FIG. 3.

FIG. 10 is a schematic illustration of another embodiment of a probability schedule.

FIG. 11 is a schematic illustration of another embodiment of a payout schedule.

FIG. 14 depicts another embodiment of gaming device 300. Credit meters 360 for displaying the balances comprise credit meter 362 for displaying balance 1 and credit meter 364 for displaying balance n. Although credit meters 360 are depicted in FIG. 14 as two credit meters, credit meters 360 may comprise any plurality of credit meters.

DETAILED DESCRIPTION OF THE PREFERRED EMBODIMENTS

A gaming device provided in accordance with the present invention includes a plurality of balances. When the player provides the gaming device with monetary input, a balance is selected and that balance is adjusted by the monetary input. The balance may be selected based on various criteria. For example, different sources of monetary input may establish different balances, or different amounts of monetary input may establish different balances.

Drawing a wager amount from different balances provides the player with different gaming experiences. Consequently, there are different incentives for players to use the balances. For example, drawing a wager amount from a particular balance may provide a higher probability of a more favorable game outcome, or may provide a higher award amount for a particular game outcome. Accordingly, the player has an incentive to establish and draw from that balance.

Figure 1:
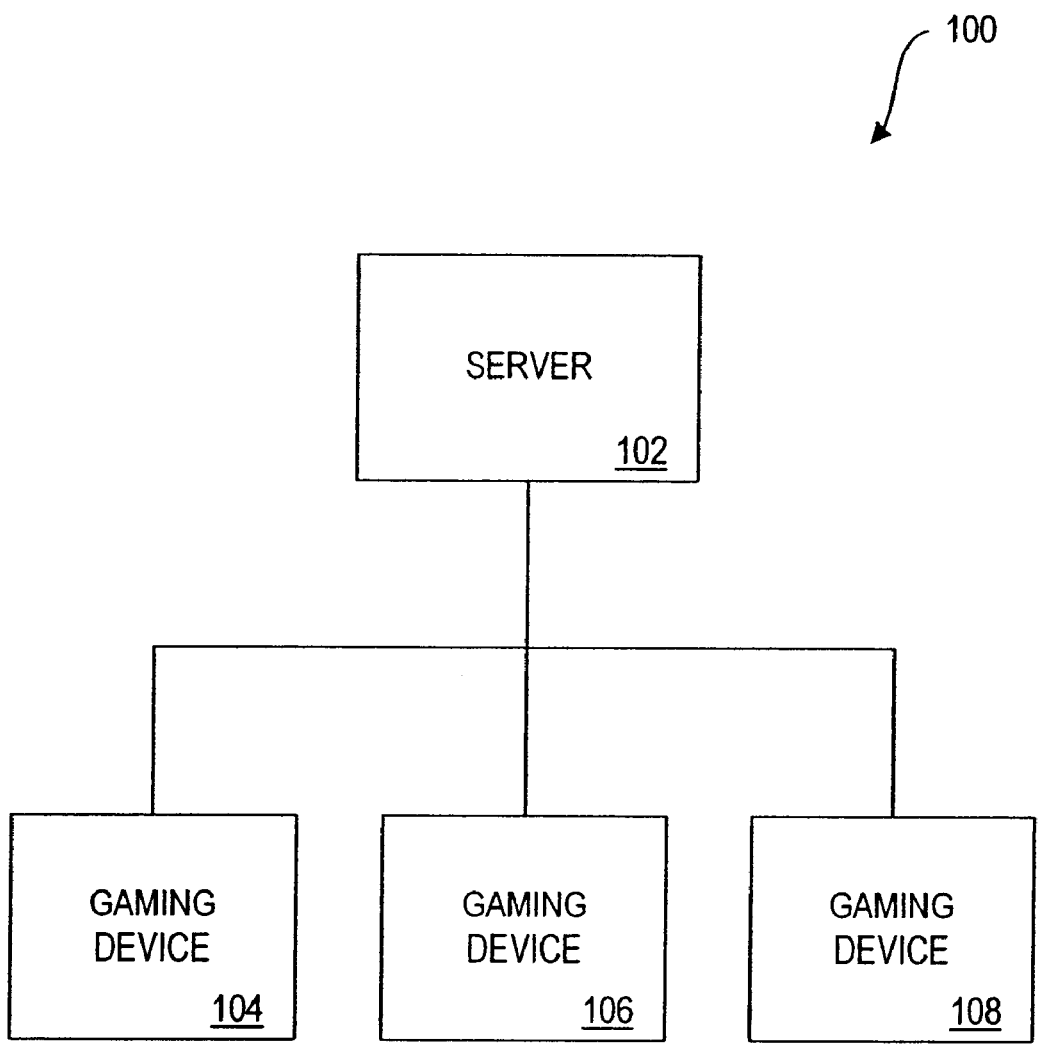
FIG. 1 is a schematic illustration of a network of gaming devices.

Referring to FIG. 1, a network 100 includes a server 102 that is in communication with gaming devices 104, 106 and 108. Although three gaming devices are shown, any number of gaming devices may be in communication with the server 102. The gaming devices 104, 106 and 108 may communicate with the server 102 through a number of mediums, such as wireless (e.g. radio-frequency or infrared) or serial cable. As described below, data exchanged between the gaming devices 104, 106 and 108 and the server 102 may represent player names and corresponding identifiers, balance amounts and game outcomes.

Figure 2:
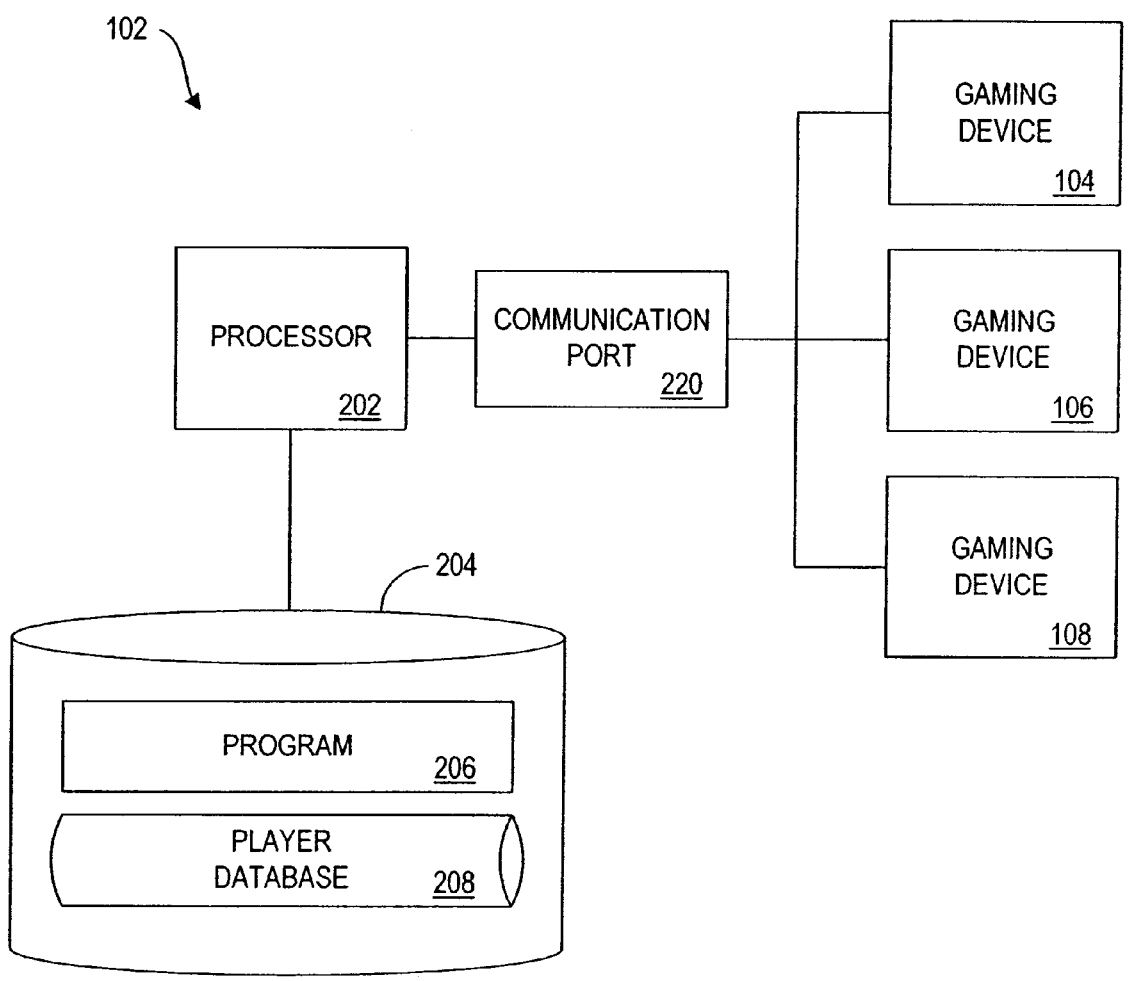
FIG. 2 is a schematic illustration of a server of FIG. 1.

Referring to FIG. 2, the server 102 includes a processor 202, such as one or more conventional microprocessors, that is in communication with a data storage device 204. The data storage device 204 stores (i) a program 206 for directing the processor 202 in accordance with the present invention, and particularly in accordance with the processes described in detail hereinafter; and (ii) a player database 208. The player database 208 stores information on each player, including each player's casino account balance and "player-reward points" balance. Player-reward points are typically awarded by the casino and redeemable for food, drink, entertainment and/or lodging. Those skilled in the art will understand that the data storage device 204 may store other types of information.

The processor 202 is also in communication with a communication port 220, which is in turn in communication with the gaming devices 104, 106 and 108. The communication port 220 may include multiple communication channels for simultaneous communication with a plurality of gaming devices.

Figure 3:
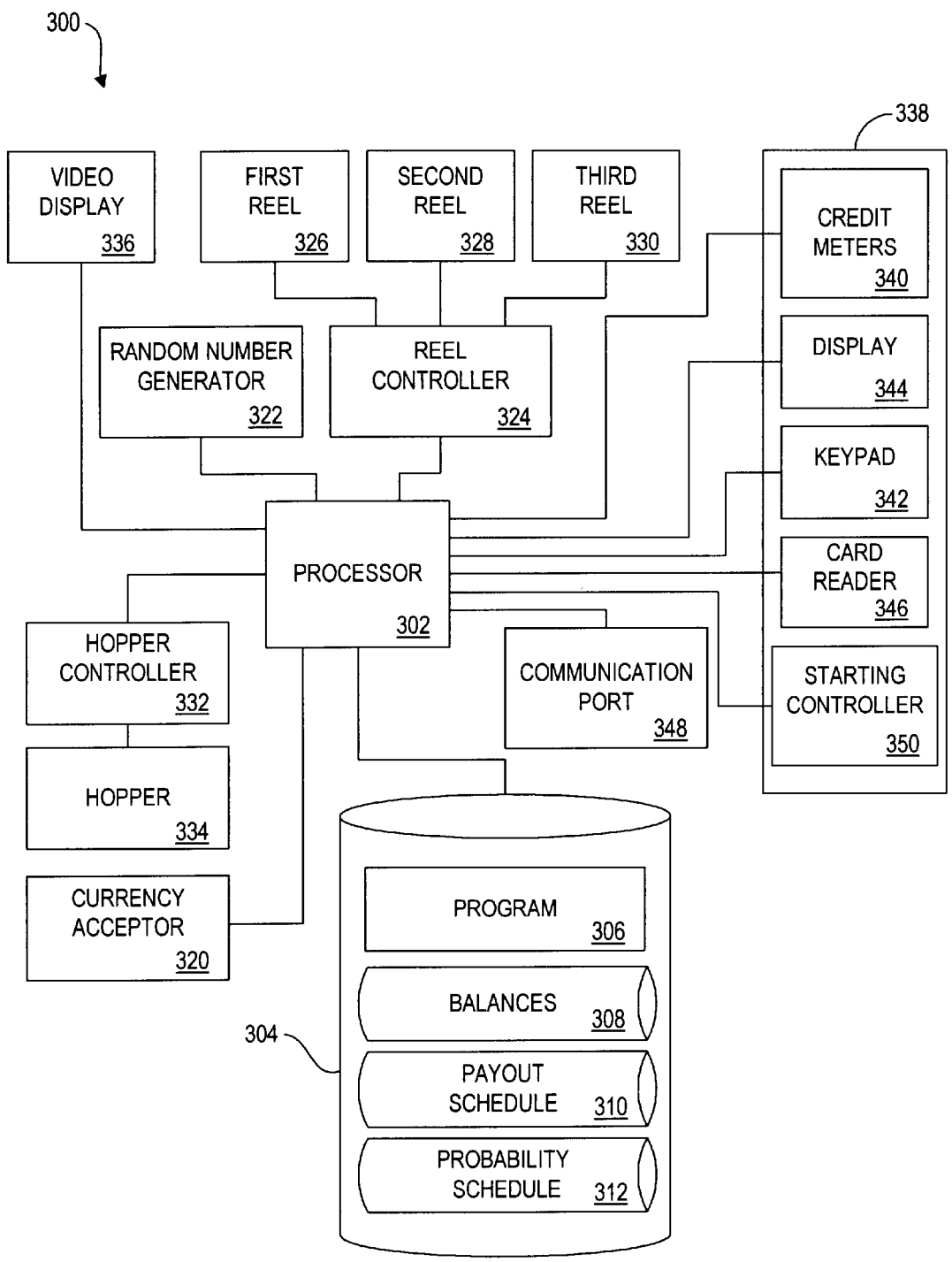
FIG. 3 is a schematic illustration of a gaming device of FIG. 1.

Referring to FIG. 3, a gaming device 300 includes processor 302 in communication with a data storage device 304. The data storage device 304 stores (i) a program 306 for directing the processor 302 in accordance with the present invention, and particularly in accordance with the processes described in detail hereinafter; (ii) a plurality of balances 308; (iii) a payout schedule 310; and (iv) a probability schedule 312.

The processor 302 is also in communication with a currency acceptor 320 for accepting coins, bills and tokens, thereby allowing a player to establish one or more balances with the gaming device 300. The processor 302 is further in communication with a random number generator 322 and a reel controller 324. The reel controller 324 is in turn in communication with a set of reels 326, 328 and 330. In response to the initiation of play, the random number generator 322 determines a game outcome, and the reel controller 324 causes the reels 326, 328 and 330 to spin and stop at a combination of reel positions corresponding to the game outcome.

The processor 302 is further in communication with a hopper controller 332, which in turn is in communication with a hopper 334. The hopper 334 stores a supply of currency, and the hopper controller 332 controls the amount of currency to be received by or dispensed from the hopper 334.

In an alternate or supplemental embodiment, a video display 336 is in communication with and controlled by the processor 302 to display the outcome of a play. A player interface 338, also in communication with and controlled by the processor 302, comprises (i) credit meters 340 for displaying the balances, (ii) a keypad 342 for entering data, (iii) a display 344 for displaying the data, error messages and other information, and (iv) a card reader 346 for reading a player tracking card or financial card such as a credit card or smart card. The keypad 342 may include electro-mechanical buttons, a touch screen, or any other suitable means of data input that allows the player to enter data described herein. The card reader 346 may be, for example, the Mastercom device, commercially available from Bally Manufacturing. For a discussion of player card tracking devices, see, for example, U.S. Pat. No. 5,429,361 to Raven et al., incorporated by reference herein.

The gaming device 300 can be operatively connected to a network through a communication port 348. Such a connection allows the gaming device 300 to access account information and verify account status, and further allows balances to be dispensed or transferred between gaming devices. Also in communication with the processor 302 is a starting controller 350, which the player operates to initiate a play. The starting controller 350 may be, for example, a handle pulled by the player or a button actuated by the player.

As will be understood by those skilled in the art, functions performed by the server 102, such as providing each gaming devices 104, 106 and 108 with information on casino account balances, may be performed by the gaming device 300.

The description that follows is arranged into the following sections: Establishing Balances, Selecting a Wager Amount, Determining an Award Amount and Dispensing Monetary Output.

Establishing Balances

Figure 4:
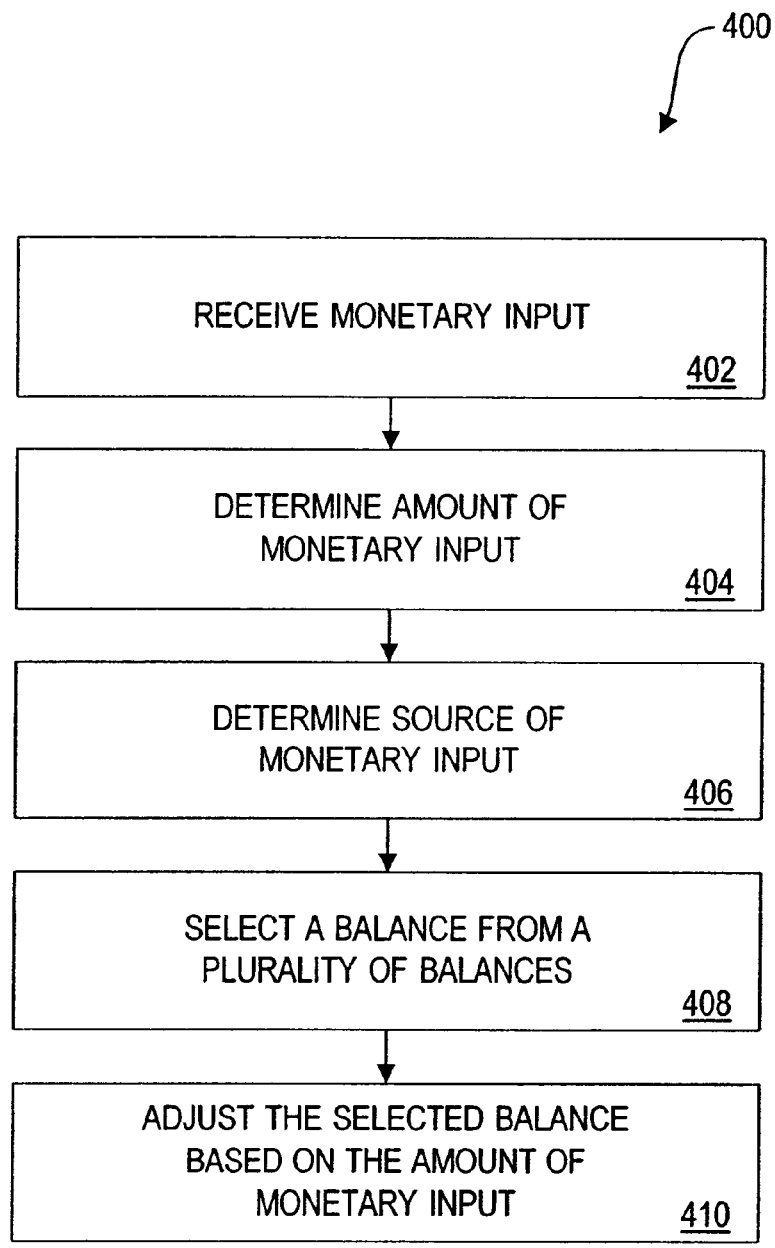
FIG. 4 is a flow chart illustrating a process for establishing balances.

Referring to FIG. 4, a process 400 for establishing balances initiates when a gaming device receives monetary input (step 402). For example, a player may (i) insert currency into the gaming device, or (ii) insert a credit card or a player tracking card that identifies a casino account and indicate an amount to transfer to the gaming device. The gaming device determines the amount of monetary input that was received (step 404), in a manner known to those skilled in the art. The gaming device also determines the source of the received monetary input (step 406). For example, the gaming device can detect whether currency was inserted into the currency acceptor 320 (FIG. 3), or whether a card was inserted into the card reader 346 (FIG. 3). Two possible sources of the monetary input are (i) an account stored on casino server (a "casino account"), and (ii) the player (for currency, credit cards, debit cards and smart cards). Many other types of sources may be defined, and these other sources may be detected by the gaming device.

The gaming device then selects one or more balances from a plurality of balances (step 408). In one embodiment, the gaming device may select the balance based on the source of the monetary input. For example, there may be three balances, each corresponding to one of three possible sources of monetary input. In another embodiment, the gaming device selects the balance based on the amount of the monetary input. For example, there may be two balances, each corresponding to a different range of amounts. One balance may correspond to amounts greater than a predetermined threshold, and the second balance may correspond to amounts less than or equal to a predetermined threshold. For example, the threshold for a three-coin slot machine may be five coins. In another embodiment, a balance may be selected based on both the source and amount of the monetary input. A further description of the step of selecting a balance is described below.

After a balance is selected, the gaming device next adjusts the selected balance based on the amount of the monetary input (step 410). Typically, the gaming device increases the selected balance by the amount of the monetary input. Alternatively, the gaming device may increase the selected balance by a predetermined percentage of the amount of the monetary input. For example, if $100.00 of monetary input is received, the gaming device may apply 105% of the $100.00 to the selected balance, thereby increasing the selected balance by $105.00.

Each balance has an associated payout schedule, an associated probability schedule, or both. Accordingly, there can be different incentives associated with each balance. The gaming device may include balances and associated incentives to, for example, promote the use of a casino account rather than currency, or to promote establishing a large balance. In other embodiments, each balance may include further associated data, such as a schedule of "player-reward points", thereby providing different incentives for using various balances.

Figure 5:
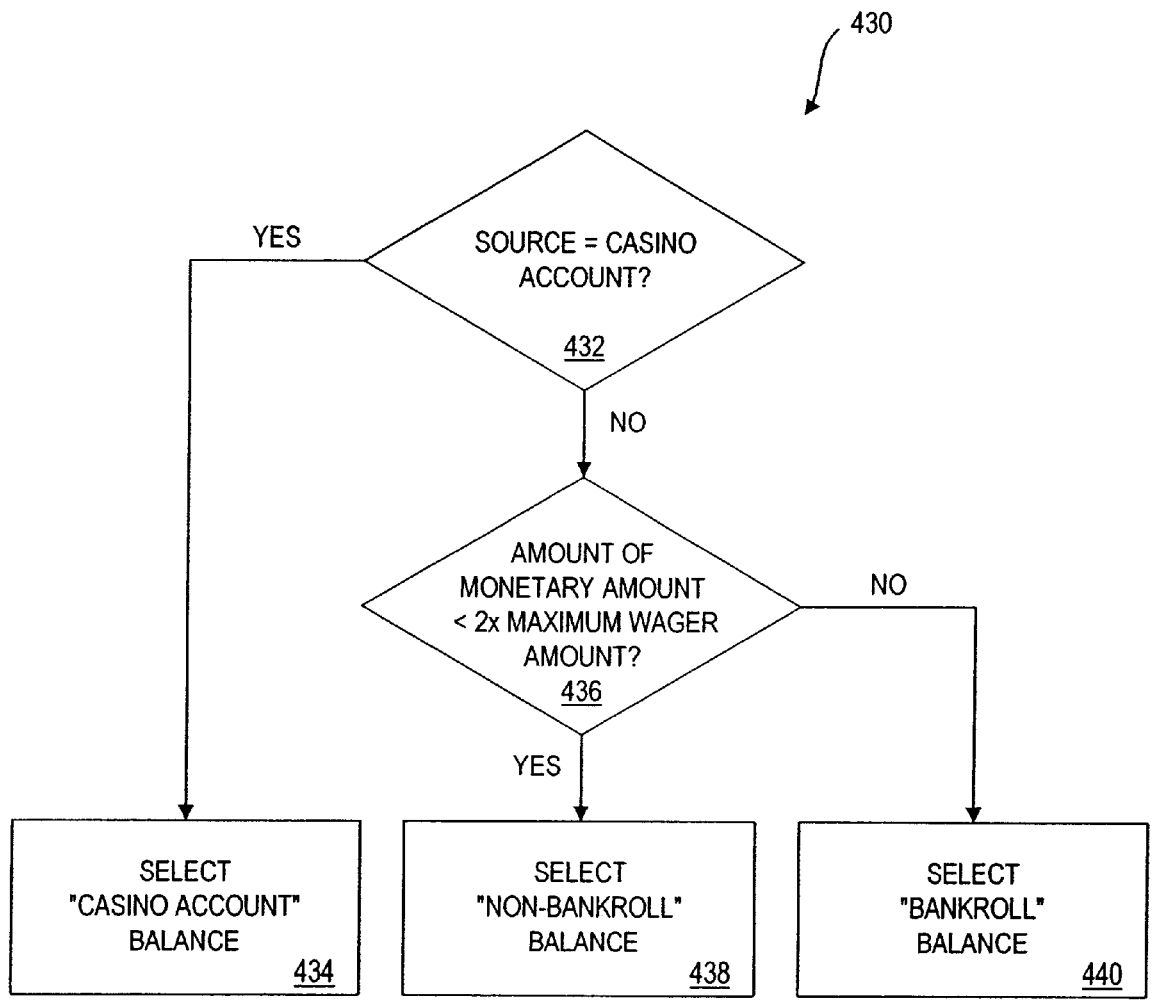
FIG. 5 is a flow chart illustrating an exemplary process for selecting a balance.

Referring to FIG. 5, an exemplary process 430 for selecting a balance (as indicated by the step 408 of FIG. 4) begins with a determination of the source of the monetary input (step 432). If the source is a casino account, then a "casino account" balance is selected (step 434). Otherwise, the gaming device determines the amount of monetary input (step 436). For example, if the amount is less than a predetermined threshold of twice the maximum wager of the gaming device, then a "non-bankroll" balance is selected (step 438). If the amount is not less than twice the maximum wager of the gaming device, then a "bankroll" balance is selected (step 440). Of course, the names attributed to balances may be varied as desired.

In the exemplary process 430, there are three balances ("casino account" balance, "non-bankroll" balance, and "bankroll" balance). Those skilled in the art will realize that any number of balances may be provided in accordance with the present invention. The particular criteria for selecting a balance may be designed to further any number of goals. For example, whether monetary input increases the "non-bankroll" balance or the "bankroll" balance depends on whether the amount exceeds a threshold. In the example of FIG. 5, such a threshold was twice the maximum wager of the gaming device. Such a threshold is established in order to discriminate between players that provide only enough payment for one play, or sufficient payment for more than one play.

A plurality of balances may be increased in the manner described above. For example, a player may first provide the gaming device with funds from a casino account, thereby increasing the "casino account" balance. Thereafter, the player may insert currency into the machine, increasing the "non-bankroll" balance or the "bankroll" balance, depending on the amount of currency inserted.

Selecting a Wager Amount

Once one or more balances are established, the player selects a wager amount and initiates a play of the gaming device. Since there is more than one balance, the gaming device must determine a "wagering balance" from which the wager amount is drawn.

Figure 6:
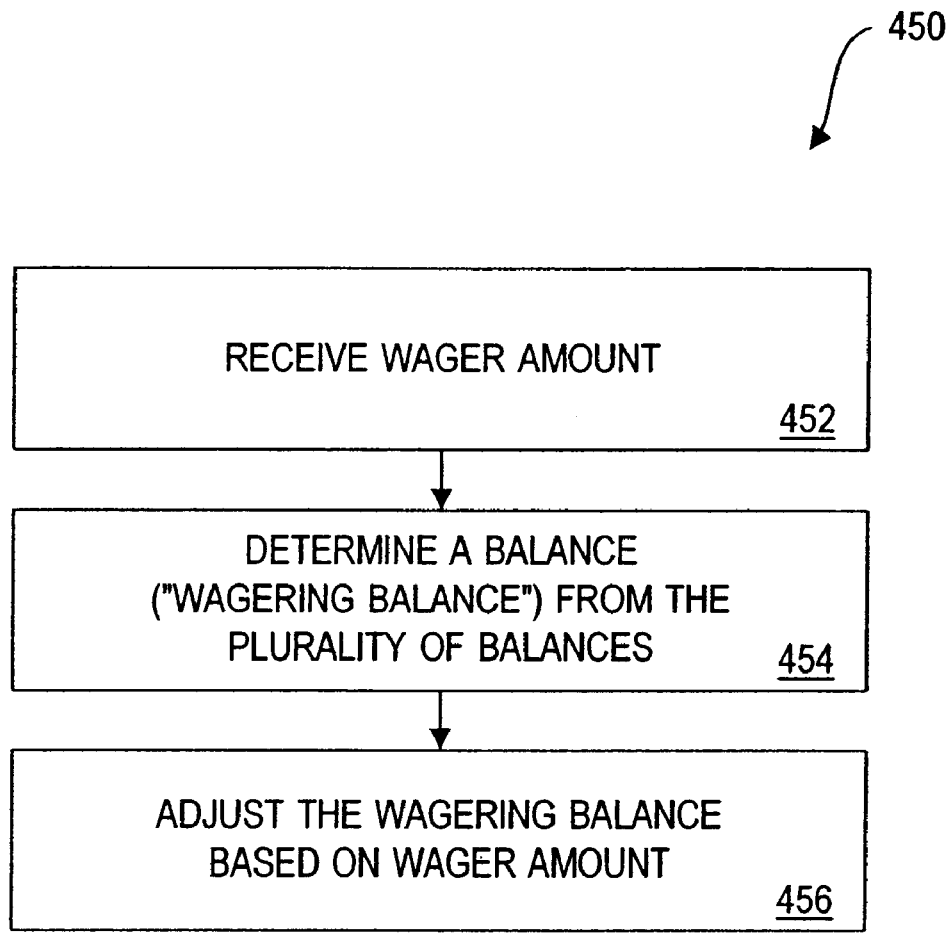
FIG. 6 is a flow chart illustrating a process for selecting a wager amount.

Referring to FIG. 6, a process 450 for selecting a wager amount begins when the gaming device receives a wager amount from the player (step 452). As is known in the art, the player may actuate one or more keys of the keypad 342 (FIG. 3) to indicate the wager amount. For example, many video poker machines have a "Bet Max" button, indicating the maximum wager amount for the machine. Other methods of indicating the wager amount will be understood by those skilled in the art.

A balance from the plurality of balances is determined (step 454). For example, the player may select the balance using the keypad 342 (FIG. 3), which in turn generates a signal that represents the selected balance. Alternatively, the balance may be determined based on the wager amount. For example, if the wager amount is less than a predetermined threshold, a first balance is used. Otherwise, a second balance is used. In such an embodiment, it is desirable to provide an advantage to using the second balance, since players would then have an incentive to select wager amounts greater than the predetermined threshold. Large wager amounts are typically preferred by casinos. For example, it can be advantageous to provide an incentive for a player to wager the maximum amount allowed for the gaming device.

In another embodiment, the balance may be determined based on one or more predetermined rules. For example, one rule may specify that any balance greater than or equal to the wager amount is the determined balance. Another rule may specify that the greatest balance is the determined balance. Many such rules will be understood by those skilled in the art. The rules may be retrieved from the data storage device 304 (FIG. 3), and/or may be selected by the player upon actuation of appropriate keys of the keypad 342 (FIG. 3).

More than one balance may be determined. For example, the wager amount may be greater than any one balance, so a set of two or more balances may be drawn from. Each such balance may be determined as described above.

Once a balance is determined, that balance, deemed the wagering balance, is adjusted based on the wager amount (step 456). Typically, the wagering balance is decreased by the wager amount. However, in certain embodiments the wagering balance may be decreased by a predetermined percentage of the wager amount. For example, if a $5.00 wager amount is received, the gaming device may apply 95% of the $5.00 to the wagering balance, thereby decreasing the wagering balance by $4.75. Such an embodiment may provide an incentive for using a particular balance as the "wagering balance".

In other embodiments, a set of wagering balances is adjusted by the wager amount. Each wagering balance is adjusted by a portion of the wager amount. The set of wagering balances may also be adjusted based on the wager amount and one or more predetermined rules. Such rules may, for example, specify the portions of the wager amount, and each wagering balance that is decreased thereby.

Determining an Award Amount

Figure 7:
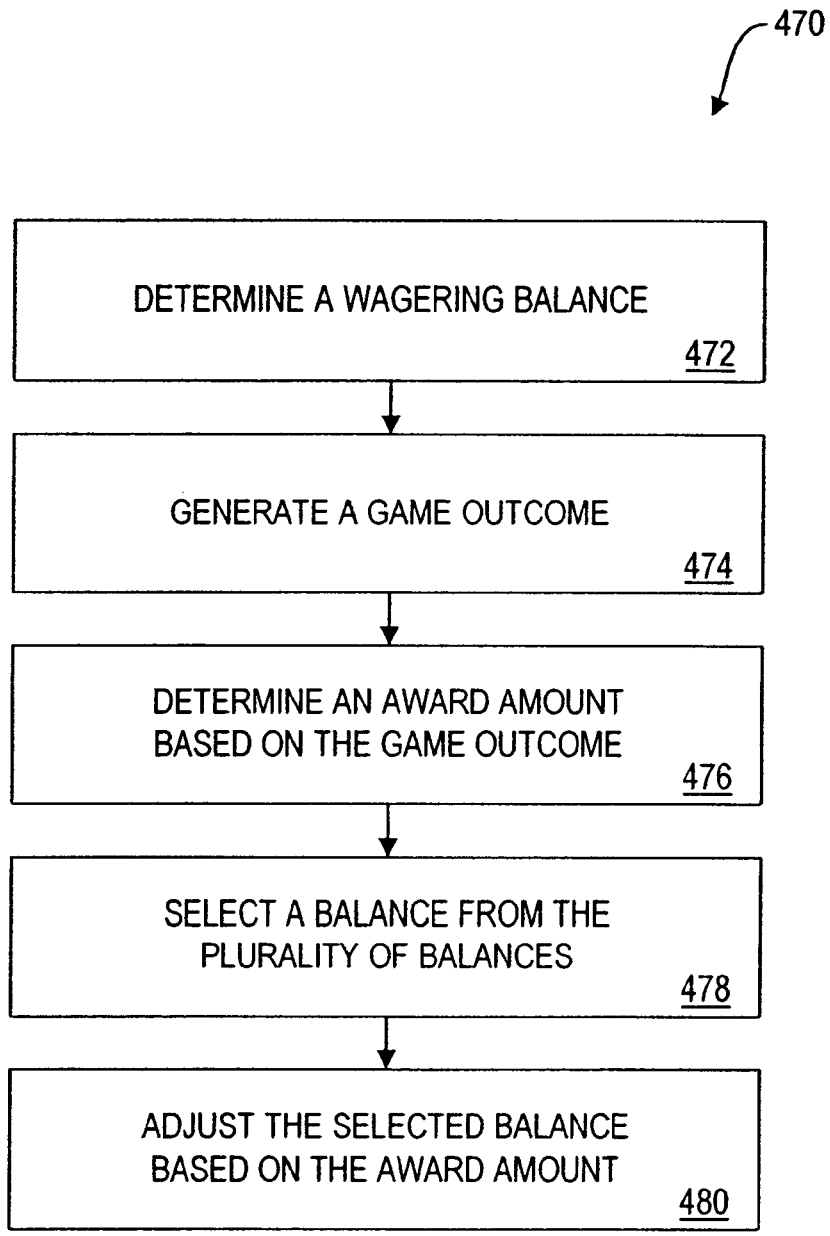
FIG. 7 is a flow chart illustrating a process for determining an award amount.

Referring to FIG. 7, a process 470 for determining an award amount includes a step 472 of determining a wagering balance from the plurality of balances. The step 472 has been described above in conjunction with FIG. 6. The gaming device next generates a game outcome (step 474), typically by generating a random number, and in turn accessing a probability schedule to determine a game outcome corresponding to the random number. An award amount based on the game outcome is then determined (step 476). One method of determining the award amount is to access a payout schedule to determine an award amount corresponding to the game outcome. A balance is selected from the plurality of balances (step 478), and that balance is adjusted based on the award amount (step 480).

Referring to FIG. 8, an exemplary probability schedule 500 defines a set of outcomes 502 and corresponding likelihoods of the outcomes. The probability schedule 500 includes entries 508–542, each defining an outcome and its corresponding probability of occurrence. The probability of occurrence of each outcome is defined by a range 504 of random numbers, and/or a number of expected hits per cycle 506.

The exemplary probability schedule 500 includes a number of slot machine-type outcomes. As is known in the art, in a typical slot machine having three reels, each reel may assume one of twenty-two positions. Accordingly, there are 10,648 reel combinations (22×22×22=10,648). For a more detailed discussion of slot machines, associated probabilities and payouts, reference may be made to J. Regan, Winning at Slot Machines (Citadel Press 1985), incorporated by reference herein.

To generate an outcome, the gaming device generates a random number from "1" to "10,648". The generated random number corresponds to one entry, and therefore to one outcome. The number of expected hits per cycle 506 defines the average number of times each outcome will be generated for a cycle of 10,648 plays. Accordingly, a greater number of expected hits per cycle indicates a more likely outcome.

Referring to FIG. 9, an exemplary payout schedule 550 defines a set of outcomes 552 and corresponding award amounts 554. The payout schedule includes entries 555–588, each defining an outcome and its corresponding award amount. For example, the entry 556 indicates that an outcome "CHERRY/ANY/ANY" corresponds to an award amount of "2".

Given a probability schedule and a payout schedule, an award may be determined for a play. For example, referring again to FIGS. 8 and 9, if the gaming device generates a random number "10,358" during a play, this random number corresponds to the entry 518 of the probability schedule 500 (FIG. 8). The entry 518 defines the outcome "CHERRY/ANY/CHERRY". Similarly, the entry 564 of the payout schedule 550 also defines the outcome "CHERRY/ANY/CHERRY". The entry 564 corresponds to an award amount "5", and thus for this play the award amount is five (coins or other units of monetary input).

In another embodiment, each balance may have an associated probability schedule, and the gaming device may generate the game outcome based on the probability schedule of the wagering balance. Accordingly, the player would have different incentives to draw from different wagering balances.

Referring to FIG. 10, an embodiment of a probability schedule 600 defines a set of outcomes 602 and corresponding likelihoods of the outcomes for each of three balances. The probability schedule 600 includes entries 608–642, each defining (i) an outcome, (ii) a probability of occurrence for wager amounts drawn from a "non-bankroll" balance, (iii) a probability of occurrence for wager amounts drawn from a "bankroll" balance, and (iv) a probability of occurrence for wager amounts drawn from a "casino account" balance.

The probability of occurrence for wager amounts drawn from the "non-bankroll" balance is defined by a range 645 of random numbers, and/or a number of expected hits per cycle 650. The probability of occurrence for wager amounts drawn from the "bankroll" balance is defined by a range 655 of random numbers, and/or a number of expected hits per cycle 660. The probability of occurrence for wager amounts drawn from a "casino account" balance is defined by a range 665 of random numbers, and/or a number of expected hits per cycle 670.

As illustrated by the exemplary information of FIG. 10, for any particular outcome, the probability of occurrence may be different for different balances. For example, the entry 626 that defines an outcome "ORANGE/ORANGE/ ORANGE", has for each balance a different number of expected hits per cycle. The number of expected hits per cycle for the "non-bankroll" balance is "42", the number of expected hits per cycle for the "bankroll" balance is "44", and the number of expected hits per cycle for the "casino account" balance is "48". Accordingly, the outcome "ORANGE/ORANGE/ORANGE" is more likely to occur when the wager amount is drawn from the "casino account" balance than from the "non-bankroll" balance or the "bankroll" balance.

In addition, if the gaming device generates a random number "10,607", that random number would correspond to (i) the entry 636 (game outcome "BELL/BELL/BAR") if the wager amount is drawn from the "non-bankroll" balance, (ii) the entry 638 (game outcome "BELL/BELL/BELL") if the wager amount is drawn from the "bankroll" balance, and (iii) the entry 638 (game outcome "BELL/BELL/BELL") if the wager amount is drawn from the "casino account" balance. After generating such a game outcome, the gaming device may next determine an award amount from a payout schedule, such as the payout schedule 550 (FIG. 9).

Referring to FIG. 11, an embodiment of a payout schedule 700 defines a set of outcomes 702 and corresponding award amounts for each of three balances. The payout schedule 700 includes entries 708–742, each defining (i) an outcome, (ii) an award amount 744 for wager amounts drawn from a "non-bankroll" balance, (iii) an award amount 746 for wager amounts drawn from a "bankroll" balance, and (iv) an award amount 748 for wager amounts drawn from a "casino account" balance. For example, the entry 742 indicates that an outcome "7/7/7" corresponds to an award amount of "100" for wager amounts drawn from a "non-bankroll" balance, an award amount of "120" for wager amounts drawn from a "bankroll" balance, and an award amount of "130" for wager amounts drawn from a "casino account" balance. In this manner, players are provided an incentive to create, and in turn draw wager amounts from, the "casino account" balance.

As described above with reference to FIG. 7, once an award amount is determined, a balance is selected from the plurality of balances, and that balance is adjusted based on the award amount. Typically, the selected balance is increased by the award amount. In another embodiment, the selected balance is increased by a predetermined percentage of the award amount.

In one embodiment, the selected balance is the wagering balance. In another embodiment, the selected balance is a predetermined balance that is increased by all award amounts the player wins. For example, there may be a "payout" balance that is increased by all award amounts won by the player. It can be advantageous to provide an incentive to draw wager amounts from such a "payout" balance, since many players view "won" money as less valuable than "their own" money and therefore are less conservative when wagering with it.

In another embodiment, the balance may be selected based on one or more predetermined rules. For example, one rule may specify that any balance below a predetermined threshold is the selected balance. Another rule may specify that the greatest balance is the selected balance. Still another rule may specify that the balance providing the greatest advantage (i.e. the most incentive) to the player is the selected balance. Many such rules will be understood by those skilled in the art. The rules may be retrieved from the data storage device 304 (FIG. 3), and/or may be selected by the player upon actuation of appropriate keys of the keypad 342 (FIG. 3).

In one embodiment, the award amount may be determined by generating a supplemental (second) game outcome if the (first) game outcome corresponds to a non-winning outcome. The award amount would then be determined, as described above, based on the supplemental game outcome. In such an embodiment, the player may be prompted to "spin again", or otherwise initiate a second play, for free.

In one embodiment that encourages the use of under-utilized gaming devices, as well as the use of accumulated winnings for subsequent play, the "payout" balance may be transferred to another gaming device across the network. Thus, when the "payout" balance is transferred to a predetermined (under-utilized) gaming device, and a wager amount is drawn from the "payout" balance, the "payout" balance would be decreased by a fraction of the wager amount. For example, if a "payout" balance is transferred to a predetermined gaming device, and a wager amount of $5 is drawn from this balance, the balance may be decreased by only $4.75. Such a decrease represents a "bonus" of 5% ($5−$4.75=$0.25=5% of $5). Other incentives may be provided for using the "payout" balance.

Similarly, this bonus may be increased as time passes, thereby providing an incentive to return to the casino. Alternatively, the bonus may be decreased as time passes, thereby providing an incentive to return promptly to the casino. Further, the bonus may decrease to zero after a predetermined time period elapses.

Dispensing Monetary Output

Figure 12:
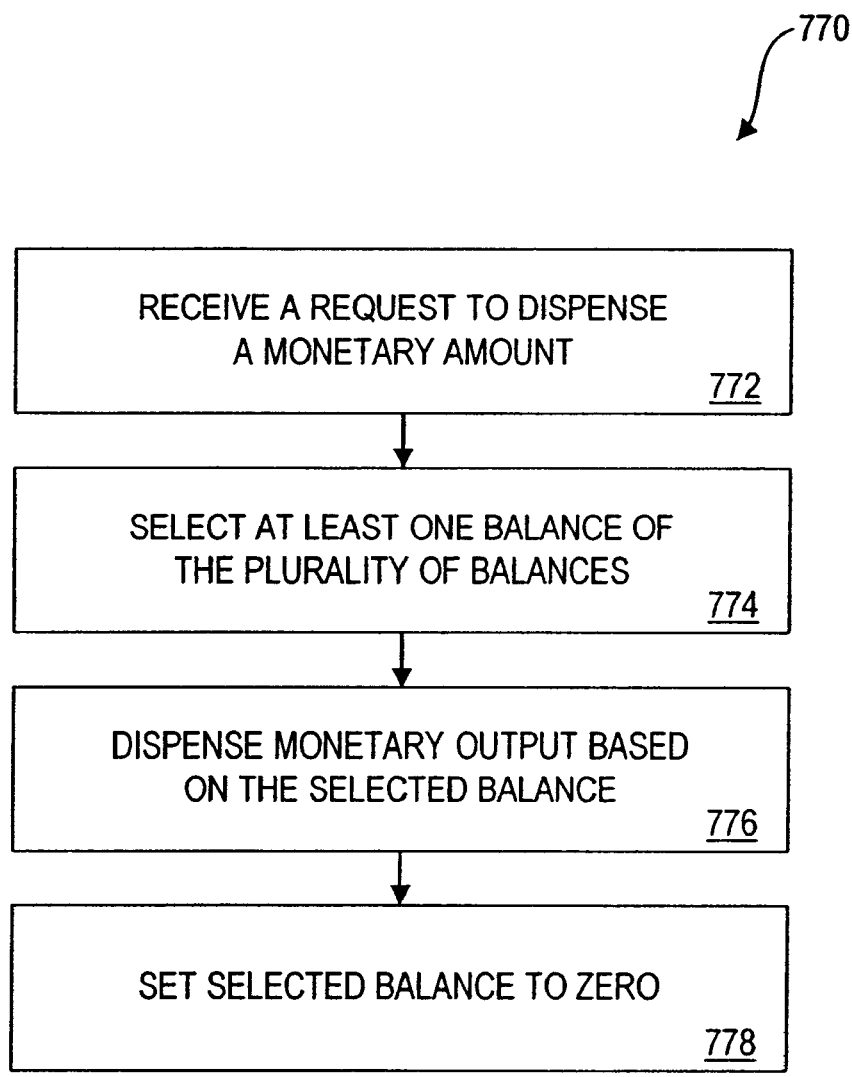
FIG. 12 is a flow chart illustrating a process for dispensing monetary output.

Referring to FIG. 12, a process 770 initiates when the gaming device receives a request to dispense monetary output (step 772). At least one balance is selected (step 774), and a monetary amount based on the selected balance(s) is dispensed (step 776). Each selected balance is in turn set to zero (step 778).

The player may select the balance using the keypad 342 (FIG. 3), which in turn generates a signal that represents the selected balance. Alternatively, the balance may be determined based on at least one predetermined rule. Rules and their application to the present invention have been described above. For example, a rule may specify that all balances that are greater than zero are selected.

As also described above, dispensing typically includes activating a hopper in the gaming device to dispense an amount of currency to the player. Some gaming devices alternatively credit an account with the monetary amount based on the selected balance(s). Such an account may be identified by a signal received from card reader 346 (FIG. 3) of the gaming device. The account may be, for example, a credit card account or casino account stored on a casino server.

Figure 13:
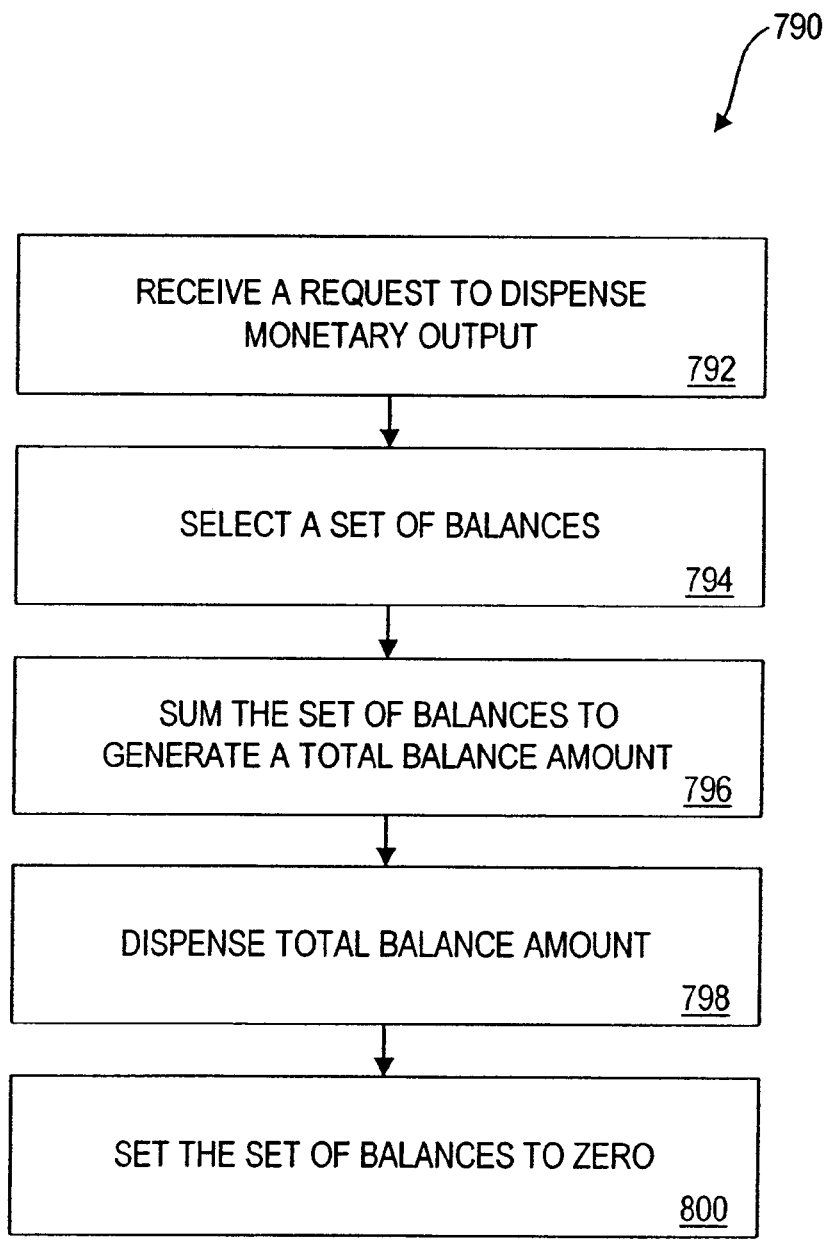
FIG. 13 is a flow chart illustrating another embodiment of a process for dispensing monetary output.

Referring to FIG. 13, in another embodiment a set of two or more balances is selected, and the corresponding amount dispensed. A process 790 initiates when the gaming device receives a request to dispense monetary output (step 792).

Next, a set of balances are selected (step 794), and the selected balances are summed to generate a total balance amount (step 796). Finally, the total balance amount is dispensed (step 798) and each selected balance is set to zero (step 800).

Alternatively, the total balance amount may be generated by summing the set of balances and a bonus value. Such a bonus value may be based on a balance. For example, if two balances have values of "$15" and "$40", and the bonus value is 50% of the second balance, then the total balance is $75 ($75=$15+$40+50% of $40).

In an alternate or supplemental embodiment, additional types of balances can be defined. For example, a "marker" balance can be defined as funds obtained by the player from the casino by signing a promissory note or other credit instrument, or otherwise "borrowed" by the player from the casino. Typically, such a marker balance allow a player to play at times when the player does not have any currency or account balance available. If a player ends up with a "net win" (cummulative award amounts exceed borrowed funds), the borrowed funds are deducted from the award amounts, and a signal can be sent to casino personnel to destroy the credit instrument. The use of marker credits can be rewarded much like the other types of balances described above.

Figure 14:
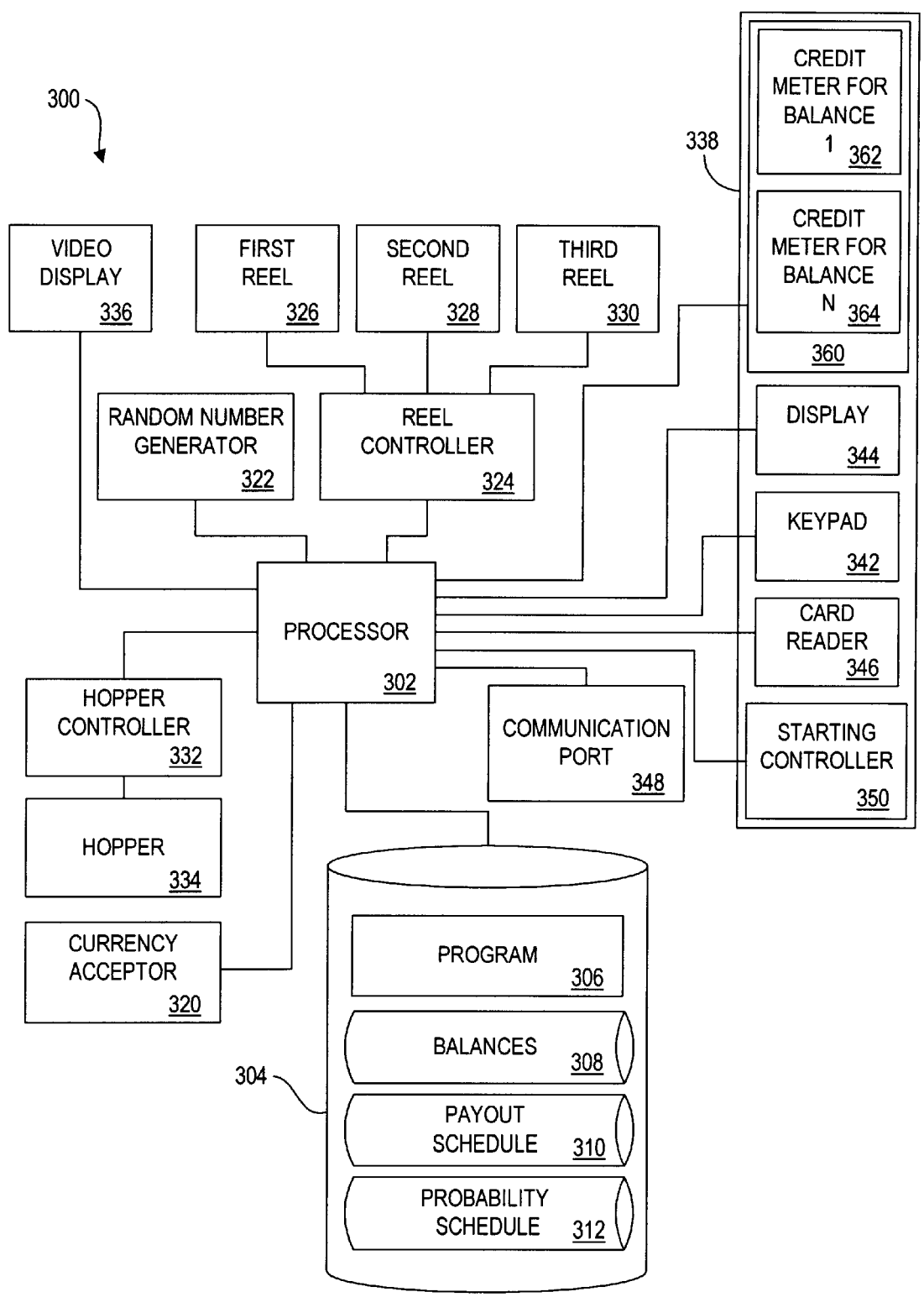
FIG. 14 is a schematic illustration of a gaming device of FIG. 1.

FIG. 14 depicts another embodiment of gaming device 300. Credit meters 360 for displaying the balances comprise credit meter 362 for displaying balance 1 and credit meter 364 for displaying balance n. Although credit meters 360 are depicted in FIG. 14 as two credit meters, credit meters 360 may comprise any plurality of credit meters.

Those skilled in the art will note that various substitutions may be made to those embodiments described herein without departing from the spirit and scope of the present invention. For example, although a slot machine has been described above, the present invention is equally applicable to other gaming devices, such as video poker machines and video blackjack machines.

What is claimed is:

1. A method comprising:
   receiving an input into at least one gaming device playable by a respective player, wherein
      each of the at least one gaming device includes a respective plurality of balances, and wherein
      for each of the at least one gaming device, the respective player can draw a wager for a respective game play from any of the respective plurality of balances;
   selecting one of the respective plurality of balances of the at least one gaming device; and
   adjusting the selected balance based on the input.

2. The method of claim 1, further comprising:
   determining a source of the input.

3. The method of claim 2, in which the source of the input is a player.

4. The method of claim 2, in which the source of the input is a third party.

5. The method of claim 2, in which the step of selecting a balance from a plurality of balances comprises:
   selecting a balance from a plurality of balances based on the source of the input.

6. The method of claim 1, in which the step of selecting a balance from a plurality of balances comprises:
   selecting a balance from a plurality of balances based on the input.

7. The method of claim 1, in which the step of selecting a balance from a plurality of balances comprises:
   selecting a set of balances from a plurality of balances, the set comprising at least two balances.

8. The method of claim 1, in which the step of adjusting the selected balance based on the input comprises:
   increasing the selected balance by an amount relative to the input.

9. The method of claim 1, in which each balance of the plurality of balances has an associated payout schedule.

10. The method of claim 1, in which each balance of the plurality of balances has an associated probability schedule.

11. An apparatus comprising:
   a processor operative to
      receive an input
      select a balance of at least one gaming device playable by a respective player, wherein
         each of the at least one gaming device includes a respective plurality of balances and wherein
         each of the respective plurality of balances is available to a player for drawing a wager for a respective game play therefrom, and wherein
         each of the respective plurality of balances is displayed to the respective player and represents an amount of wagering credit; and
      adjust the selected balance based on the input.

12. A method comprising:
   receiving a wager;
   determining a balance, thereby determining a source of the balance, of at least one gaming device playable by a respective player, wherein
      for a respective game play
         each of the at least one gaming device includes a plurality of balances, and wherein
         each of the plurality of balances is associated with a respective table, whereby
            a first balance of the plurality of balances is associated with a first table and
            a second balance of the plurality of balances is associated with a second table that is different from the first table
   adjusting the determined balance based on the wager amount; and
   determining an outcome based on the determined source and the table associated with the determined source.

13. The method of claim 12, in which the step of determining a balance from a plurality of balances comprises:
   receiving a signal that represents the balance.

14. The method of claim 12, wherein the table is at least one of a payout table and a probability table.

15. The method of claim 12, in which the step of determining a balance from a plurality of balances comprises:
   determining a balance from a plurality of balances based on at least one rule.

16. The method of claim 15, further comprising the step of:
   retrieving the at least one rule from a memory.

17. The method of claim 15, further comprising:
   receiving a signal that represents a selection of the at least one rule.

18. The method of claim 15, in which the at least one rule specifies that a balance greater than zero is the determined balance.

19. The method of claim 12, in which the step of determining a balance from a plurality of balances comprises:

determining a balance from a plurality of balances based on the wager.

20. The method of claim 12, in which the step of determining a balance from a plurality of balances comprises:

determining a set of balances from a plurality of balances, the set comprising at least two balances.

21. The method of claim 20, in which the step of adjusting the balance based on the wager amount comprises:

adjusting the set of balances based on the wager.

22. The method of claim 21, in which the step of adjusting the set of balances based on the wager comprises:

adjusting the set of balances based on the wager and at least one rule.

23. The method of claim 22, further comprising the step of:

retrieving the at least one rule from a memory.

24. The method of claim 22, further comprising the step of:

receiving a signal that represents a selection of the at least one rule.

25. The method of claim 21, in which the step of adjusting the set of balances based on the wager comprises:

decreasing the set of balances based on the wager.

26. The method of claim 25, in which the step of decreasing the set of balances based on the wager comprises:

decreasing the set of balances based on the wager and at least one rule.

27. The method of claim 20, in which the step of determining a set of balances from a plurality of balances comprises:

determining a set of balances based on at least one rule.

28. The method of claim 27, further comprising the step of:

retrieving the rules from a memory.

29. The method of claim 27, further comprising the step of:

receiving a signal that represents player selection of rules.

30. The method of claim 12, in which the step of adjusting the balance based on the wager amount comprises:

decreasing the balance by the wager.

31. A method comprising:

determining a game outcome of at least one gaming device playable by a respective player, wherein
each of the at least one gaming device includes a plurality of balances, wherein each of the plurality of balances is associated with a respective source of the balance;

determining which of the plurality of balances a wager associated with the game outcome was selected from, thereby determining which source the wager associated with the game outcome was selected from; and determining an award corresponding to the game outcome based on the determined source.

* * * * *